(12) United States Patent
Lang

(10) Patent No.: US 11,252,866 B1
(45) Date of Patent: Feb. 22, 2022

(54) UNIVERSAL STRING TRIMMER HEAD

(71) Applicant: Richard Lang, Jamestown, NC (US)

(72) Inventor: Richard Lang, Jamestown, NC (US)

( * ) Notice: Subject to any disclaimer, the term of this patent is extended or adjusted under 35 U.S.C. 154(b) by 0 days.

(21) Appl. No.: 16/942,975

(22) Filed: Jul. 30, 2020

Related U.S. Application Data

(63) Continuation-in-part of application No. 15/932,503, filed on Mar. 8, 2018, now abandoned.

(51) Int. Cl.
*B26B 27/00* (2006.01)
*A01D 34/416* (2006.01)
*A01G 3/06* (2006.01)
*A01D 34/84* (2006.01)

(52) U.S. Cl.
CPC ......... *A01D 34/4166* (2013.01); *A01D 34/84* (2013.01); *A01G 3/062* (2013.01)

(58) Field of Classification Search
CPC ............ A01D 34/4166; A01D 34/4165; A01D 34/412; A01D 34/4161; A01D 34/4163; A01D 34/416; Y10T 29/49826; A01G 3/06
USPC ......... 30/276, 428, 347; 56/12.7, 12.1, 17.5, 56/255, 245, 295
See application file for complete search history.

(56) References Cited

U.S. PATENT DOCUMENTS

| 4,367,587 | A  | * | 1/1983 | Kilmer ................. | A01D 34/416 30/276 |
| 4,641,431 | A  | * | 2/1987 | Leming ................ | A01G 3/0535 30/276 |
| 4,856,194 | A  | * | 8/1989 | Lee ...................... | A01D 34/736 30/276 |
| 5,430,943 | A  | * | 7/1995 | Lee .................... | A01D 34/4168 30/276 |
| 6,032,442 | A  | * | 3/2000 | Paolo .................. | A01D 34/416 172/13 |
| 6,094,825 | A  | * | 8/2000 | Hinson .............. | A01D 34/4166 30/276 |
| 6,240,643 | B1 | * | 6/2001 | Civalleri ............ | A01D 34/4168 30/276 |
| 6,681,865 | B2 | * | 1/2004 | Pace ...................... | A01B 1/065 172/111 |
| 6,912,789 | B2 | * | 7/2005 | Price, III ............. | A01D 34/733 30/276 |
| 6,944,956 | B1 | * | 9/2005 | Fogle ................. | A01D 34/4166 30/276 |

* cited by examiner

*Primary Examiner* — Ghassem Alie
(74) *Attorney, Agent, or Firm* — Tuggie Duggins P.A.; Blake P. Hurt

(57) ABSTRACT

A universal stringer head assembly including a cylindrical housing with an interior diameter with the geometry of a cone or wedge with a plurality of orifices passing from the exterior surface to the interior surface. Each orifice is sized and shaped to receive a fastener therethrough. Ideally, at least three orifices are equally spaced about the external circumference of the housing, facilitating the rotatable attachment of at least three fasteners to the rotatable shaft of an associated piece of lawn equipment, for example an edge trimmer.

12 Claims, 5 Drawing Sheets

US 11,252,866 B1

UNIVERSAL STRING TRIMMER HEAD

This is a Continuation-in-Part (CIP) of and claims benefits under pending prior application Ser. No. 15/932,503 filed 8 Mar. 2018, which is incorporated by reference in its entirety herein.

FIELD OF THE INVENTION

The invention herein pertains to gardening accessories generally, and particularly pertains to a universal string trimmer head assembly for use with a variety of vegetation trimmers without need an additional adapters or hardware.

DESCRIPTION OF THE PRIOR ART AND OBJECTIVES OF THE INVENTION

Vegetation trimmers are a common and valuable tool in the gardener's arsenal to tame the present-day yard. The conventional vegetation trimmer includes an electric or gas-powered motor in mechanical communication with a rotating cutting element. The rotating cutting element may take a wide variety of forms, but one of the most common embodiments of cutting element is a roll or spool of polymeric material that extends from a reel to engage with nearby vegetation. Due to the friction and/or abrasion imparted on the cutting element, not only from the vegetation but also driveways, sidewalks, brick pavers, play-sets, and the like, the majority of cutting elements as described are considered a consumable, in that they must be periodically replaced to remain effective. Additionally, due to the torque imparted by the motor on the spool, as well as the impact from the most common way of periodically extending the cutting element, wherein the spool is struck on a hard surface, compressing a biasing element that releases an additional length of material from the spool, the spool itself must be occasionally replaced to maintain the trimmer in optimal working condition. Given the mechanical interplay between the motor, the cutting element, and a shaft in torsional communication between the two, even small differences can have large impacts on the operational efficiency between trimmer manufactures, leading to increased time and cost with respect to replacement components. Further still, prior attempts to address this problem have required significant additional parts and tools, adding to the complexity and overall cost of the exchange, decreasing the likelihood that the requisite service is performed at the most advantageous time.

Thus, in view of the problems and disadvantages associated with prior art devices, the present invention was conceived and one of its objectives is to provide a universal trimmer head assembly that is efficient to manufacture and simply to install.

It is another objective of the present invention to provide a universal trimmer head that is configured (i.e. sized and shaped) to engage with the shaft of a wide range of trimmer manufacturers.

It is still another objective of the present invention to provide a universal trimmer head that is configured (i.e. sized and shaped) to accommodate a metallic wire, string, or rope in addition to polymeric cutting elements, for example a zip-tie.

It is yet another objective of the present invention to provide a universal trimmer head that is configured (i.e. sized and shaped) to accommodate a steel wire or string defining a diameter of at least 0.200 inches in diameter, and preferably 0.200 inches in diameter.

It is a further objective of the present invention to provide a universal trimmer head that is configured (i.e. sized and shaped) to engage the shaft of a trimmer at three or more points, and preferably at four points.

It is still a further objective of the present invention to provide a universal trimmer head that is configured (i.e. sized and shaped) to engage the shaft of a trimmer on two separate lateral and/or longitudinal planes.

It is yet a further objective of the present invention to provide a universal trimmer head with a housing defining an internal geometry of a cone, such that the interior surface is widest at the bottom and tapers narrower towards the top of said housing, facilitating multiple points of attachment with the trimmer shaft while minimizing vibration during use.

Various other objectives and advantages of the present invention will become apparent to those skilled in the art as a more detailed description is set forth below.

SUMMARY OF THE INVENTION

The aforesaid and other objectives are realized by providing a universal string trimmer head assembly including a cylindrical housing defining an interior diameter with the geometry of a cone and including a plurality of orifices passing from the exterior surface to the interior surface.

Each orifice is configured, (i.e. sized and shaped) to receive a fasten therethrough. In the preferred embodiment, at least three orifices are equally spaced about the external circumference of the housing, facilitating the rotatable attachment of at least three fasteners to the rotatable shaft of an associated piece of lawn equipment, for example an edge trimmer.

DETAILED DESCRIPTION OF THE PREFERRED EMBODIMENT AND OPERATION OF THE INVENTION

Figure 1:
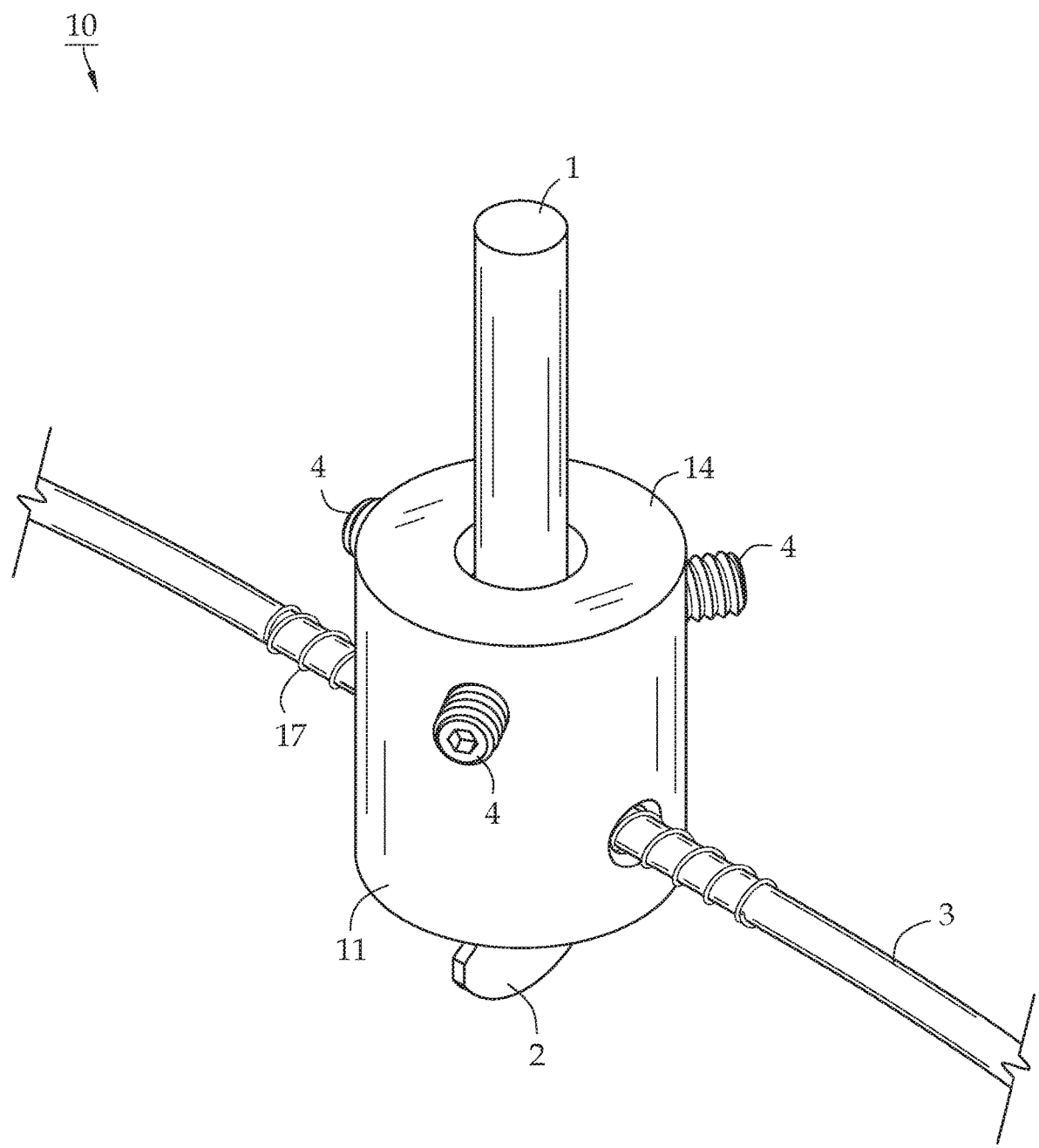
FIG. 1 shows a perspective view of the universal string trimmer assembly of the current invention.
Figure 2:
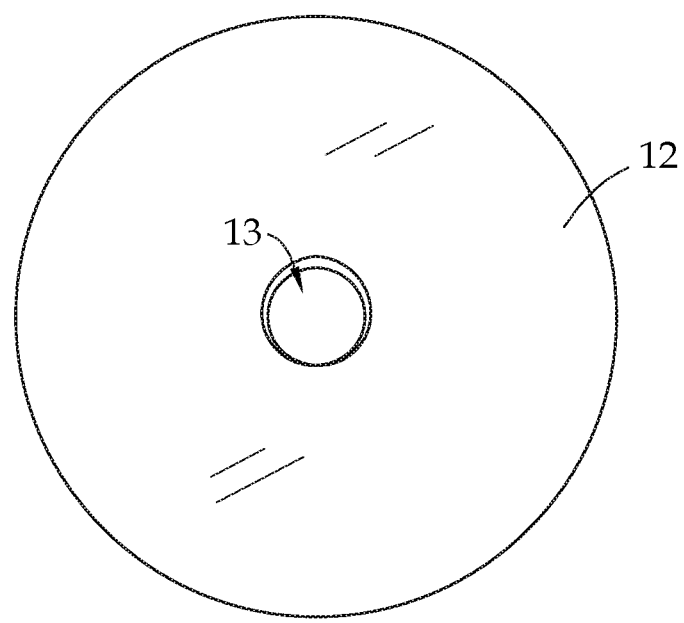
FIG. 2 pictures a top plan view of the universal string trimmer assembly of FIG. 1.
Figure 3:
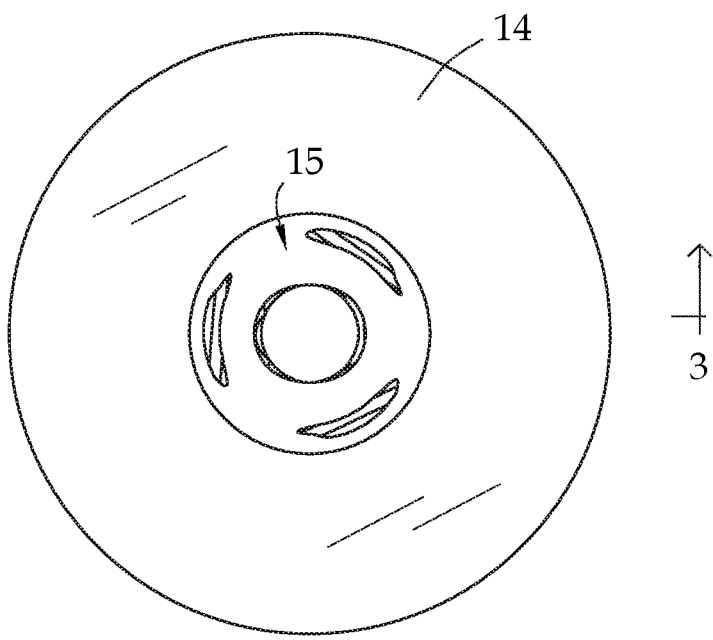
FIG. 3 depicts a bottom plan view of the universal string trimmer assembly of FIG. 1.

Various exemplary embodiments of the present disclosure are described below. Use of the term "exemplary" means illustrative or buy way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present invention is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry ad without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the invention has previously been reduced to practice or that any testing has been performed.

For a better understanding of the invention and its operation, turning now to the drawings, FIGS. 1-5 illustrate the preferred embodiment of universal stringer head assembly 10 from various angles and positions. As used in this context, the term "universal" is considered to mean compatible with a wide range of lawn equipment implements, including (but not limited to) electrical and gas-powered trimmers and edgers.

The ideal embodiment of stringer head assembly 10 includes housing 11. Housing 11 may be formed from a metallic or polymeric material, but is should be formed from a material that is resistant to heat and abrasion while being relatively lightweight in view of its size due to its intended operating environment. Housing 11 may defining a generally cylindrical exterior shape, preferably in a cooperative shape (i.e. "cooperative" in this context to mean the same, or similar to) to the shaft of a wide range of lawn equipment implements, including (but not limited to) electrical and gas-powered trimmers and edgers (illustrated in an exemplary fashion as shaft 1 in FIG. 1).

In the preferred embodiment represented in the Figs., housing 11 includes a generally planar top surface 12, a circular cross-section, and defines aperture 13 in the top surface 12 therein. In one embodiment, aperture 13 is a threaded opening configured (i.e. sized and shaped) to receive a threaded fastener (illustrated in exemplary fashion as thumbscrew 2 in FIG. 1) therethrough, for example defining a 0.20 inch (0.508 cm) diameter. In use, a threaded fastener such as thumb screw 2 may be rotatably inserted into aperture 13 to frictionally engage stringer head assembly 10 to a distal end of the shaft of a law implement like a trimmer or edger. While not intended as a limitation, and offered solely by way of example, the housing top surface 12 may measure 1.25 inches (3.175 cm) outer diameter, and aperture 13 measures ⅝ inch by 20 thread pitch and count. Housing 11 also includes a generally planar bottom surface 14, circular in cross-section, and defining opening 15 in the bottom surface 14 therein, opening 15 extending in a longitudinal direction relative to housing 11 defining a void that is contiguous with aperture 13. As will be described in further detail below, this void may be uniform in its size and shape, but the preferred void is defined by interior side walls that taper as they extend from the bottom surface 14 to the top surface 12 (i.e. the void narrows as it ascends towards the top surface). By way of example, bottom surface 14 measures 1.25 inches (3.175 cm) outer diameter, and opening 15 defines a 0.50 inch (1.27 cm) diameter. The distance from top service 12 to bottom surface 14 is preferably 1.4 inches (3.556 cm) in total length.

Figure 4:
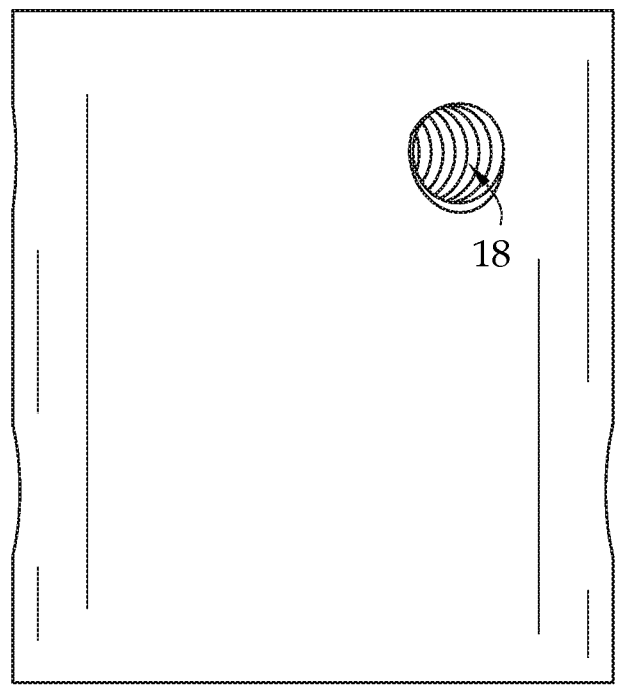
FIG. 4 demonstrates an elevated side view of the universal string trimmer assembly of FIG. 1.
Figure 5:
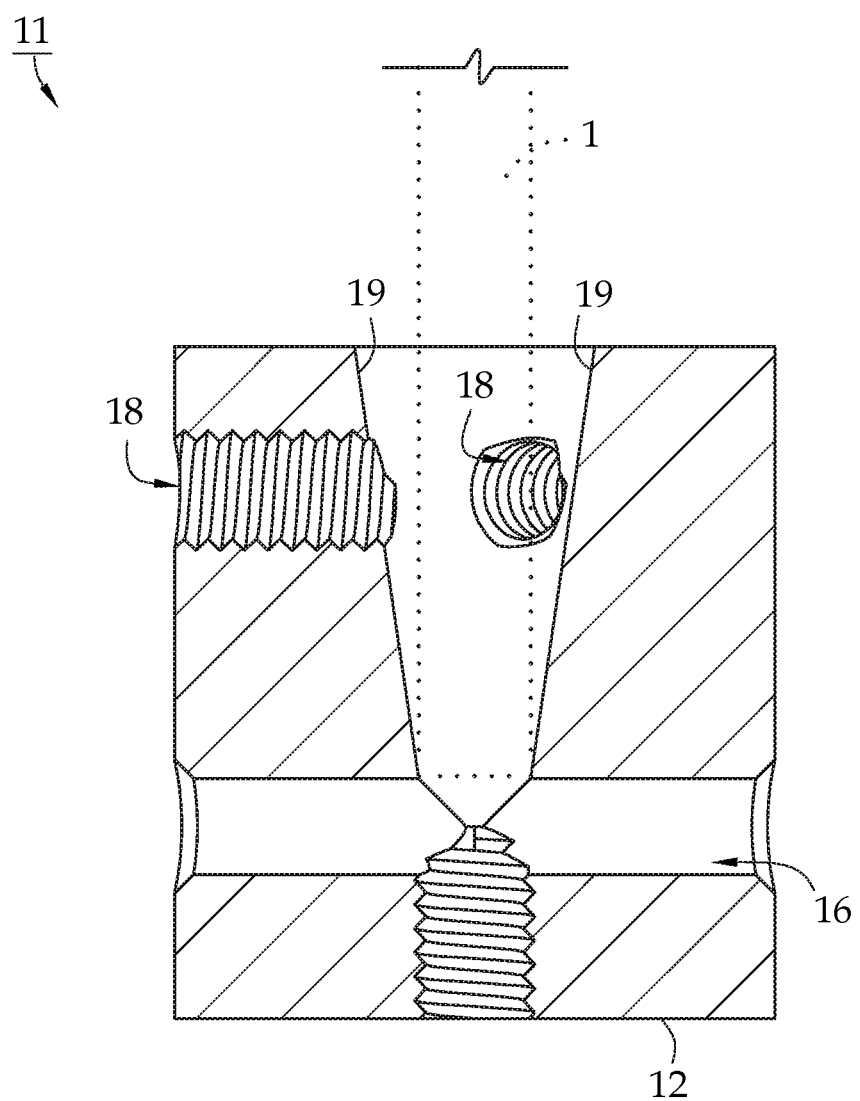
FIG. 5 illustrates an elevated side, cross-sectional view of the universal string trimmer assembly of FIG. 4.

FIGS. 4 and 5 are elevated side and cross-sectional views of preferred stringer head assembly 10. An embodiment of housing 11 additionally includes hole 16 located approximately 0.40 inches (1.016 cm) from housing top surface 12 and defining a diameter of 0.20 inches (0.508 cm) as it passes through housing 11 from one side to the other. Hole 16 is configured (i.e. sized and shaped) to accept a wide range of string, cords, and wire, up to (and in excess of) 0.200 inches in diameter, which is large enough to accommodate a range of metallic cutting wires that are otherwise too large to be used in previous replaceable stringer head assemblies as taught in the prior art (illustrated in exemplary fashion as wire 3 in FIG. 1), and more preferably a steel wire up to 0.250 inches (0.635 cm) in diameter. Such a metal wire may be purchased commercially, or customer manufactured to the custom specifications of a user. Additionally, or in the alternative, housing 11 further includes a plurality of orifices 18 spaced about the external circumference, proximate bottom surface 14 but about 0.30 inches (0.762 cm) inboard from bottom surface 14. In the preferred embodiment, three orifices 18 are spaced equally about the periphery of bottom surface 14 with each orifice existing on the same lateral plane. Ideally, each orifice 18 is a threaded opening measuring ⅝ inch by 20 thread pitch and count and configured to receive a threaded fastener, for example a set screw, therein (illustrated in exemplary fashion as set screws 4 in FIG. 1). In an alternative embodiment, one or more orifices 18 are positioned on different lateral planes relative to one or more orifices 18.

As best shown in FIG. 5, the interior surface of housing 11 is preferably not uniform in the longitudinal direction, but rather tapers from bottom surface 14 to top surface 12. Stated another way, side walls 19 are separated by approximately 0.50 inches (1.27 cm) at bottom surface 14, but slope inwardly until they define a distance of approximately 0.20 inches (0.508 cm) apart. In one configuration, this taper resembles the shape of a cone, although embodiments may be included herein that are not uniform in pitch (i.e. one side wall may angle more than the other) or continuation (i.e. the pitch may start and/or stop at a point other than the bottom and/or top surface(s)). In practice, universal stringer head assembly 10 includes housing 11 and associated hardware, but otherwise requires no additional components or adapters to securely engage with the distal end of a shaft associated with a lawn implement such as an edger or trimmer. Housing 11 is placed over the shaft via opening 15 until the shaft frictionally engages side walls 19 (illustrated in exemplary fashion in FIG. 5). The engagement is tightened by rotatably affixing a threaded fastener through aperture 13 and a plurality of fasteners through each of orifices 18 until all are snug. A predetermined length of wire, cord, or line is passed through hole 16 and held in place by a fastener, tensioner, or other restrictor member as known in the art. In the preferred embodiment, one or more biasing members 17, such as a spring, is/are positioned within housing 11 and the wire passes therethrough, so as to more securely maintain the wire in position during operation. Additionally, or in the alternative, biasing member 17 extends exterior of housing 11 and down the (exterior) longitudinal length of the wire in one or both directions to stabilize the cutting aspect of the wire during operation. The lawn implement is then ready for use, for example cutting vegetation with the rotation of the shaft, which in turn imparts rotational force to the stringer head assembly 10, all with little time required, resulting in a lightweight and aerodynamic replaceable stringer head that accommodates the strongest and thickest cutting wire available on the market.

The illustrations and examples provided herein are for explanatory purposes and are not intended to limit the scope of the appended claims.

I claim:

1. A replaceable stringer head assembly for receiving a shaft portion of a lawn equipment, said the replaceable stringer head assembly comprising a cylindrical housing, said cylindrical housing configured with a top, bottom, interior surface, and exterior surface, the exterior surface attached to the top and bottom, forming a uniform exterior diameter extending from the top to the bottom, the top surface defining an aperture extending parallel relative to a longitudinal axis defined by the cylindrical housing, the bottom surface defining an opening, the interior surface defining a void contiguous with the aperture and the opening via an interior surface sidewall, the exterior surface defining at least three threaded orifices positioned equally about a circumference of the cylindrical housing, each of the respective threaded orifices extending perpendicularly relative to the longitudinal axis defined by the cylindrical housing, wherein the interior surface sidewall tapers from a wider configuration more proximate the bottom surface to a narrower configuration more proximate the top surface, and wherein the at least three threaded orifices are configured to accept respective fasteners to frictionally impact the shaft portion of the lawn equipment in equal first, second, and third directions, wherein a bottom portion of the cylindrical housing having an opening perpendicular to the aperture for receiving a trimming line.

2. The stringer head assembly of claim 1, wherein the aperture defines a diameter of 0.20 inches.

3. The stringer head assembly of claim 1, wherein the top and bottom surfaces each define an outer diameter of 1.25 inches.

4. The stringer head assembly of claim 1, wherein the opening defines a diameter of 0.50 inches.

5. The stringer head assembly of claim 1, wherein the at least three threaded orifices defined in the exterior surface totals three.

6. The stringer head assembly of claim 1, wherein each of the at least three threaded orifices define a diameter of 0.20 inches.

7. The stringer head assembly of claim 1, wherein each of the at least three threaded orifices define a ¼ by 20 thread pitch and count.

8. The stringer head assembly of claim 1, wherein the aperture is threaded.

9. The stringer head assembly of claim 8, wherein the aperture defines a ¼ by 20 thread pitch and count.

10. The stringer head assembly of claim 1 further comprising a biasing member with a portion extending exterior of the housing, wherein the biasing member is configured to accept a portion of a wire therethrough to maintain a maximum cutting force by enforcing constant contact with vegetation during use.

11. The stringer head assembly of claim 1, wherein the at least three threaded orifices are positioned on different lateral planes.

12. A replaceable stringer head assembly for receiving a shaft portion of a lawn equipment, said the replaceable stringer head assembly comprising a cylindrical housing, said cylindrical housing configured with a top, bottom, interior surface, and exterior surface, the exterior surface attached to the top and bottom, forming a uniform diameter extending from the top to the bottom, the top surface defining an aperture extending parallel relative to a longitudinal axis defined by the cylindrical housing, the bottom surface defining an opening, the interior surface defining a void contiguous with the aperture and the opening via an interior surface sidewall, the exterior surface defining three threaded orifices positioned equally about a circumference of the cylindrical housing, each of the respective threaded orifices extending perpendicularly relative to the longitudinal axis defined by the cylindrical housing, wherein the interior surface sidewall tapers from a wider configuration more proximate the bottom surface to a narrower configuration more proximate the top surface in the shape of a triangle, and a biasing member with a portion extending exterior of the housing, wherein the biasing member is configured to accept a portion of a wire therethrough to maintain a maximum cutting force by enforcing constant contact with vegetation during use; and wherein the three threaded orifices are configured to accept respective fasteners to frictionally impact the shaft portion of the lawn equipment in equal first, second, and third directions on different lateral planes, wherein a bottom portion of the cylindrical housing having an opening perpendicular to the aperture for receiving a trimming line.

* * * * *